United States Patent [19]

Hattori et al.

[11] Patent Number: 4,517,640
[45] Date of Patent: May 14, 1985

[54] STACK MACHINE WITH IMPROVED CACHE MEMORY FOR VARIABLES

[75] Inventors: Akira Hattori, Yokohama; Hiromu Hayashi, Zama; Akio Shinagawa; Tsuyoshi Shinogi, both of Tokyo, all of Japan

[73] Assignee: Fujitsu Limited, Kawasaki, Japan

[21] Appl. No.: 393,533

[22] Filed: Jun. 30, 1982

[30] Foreign Application Priority Data

Jun. 30, 1981 [JP] Japan ............................ 56-102900
Jul. 3, 1981 [JP] Japan ............................ 56-104017
Jul. 3, 1981 [JP] Japan ............................ 56-104020

[51] Int. Cl.³ ............................................ G06F 13/00
[52] U.S. Cl. ............................................ 364/200
[58] Field of Search ... 364/200 MS File, 900 MS File, 364/300

[56] References Cited

U.S. PATENT DOCUMENTS 4,075,689 2/1978 Berkling ............................ 364/200
4,177,514 12/1979 Rupp ............................ 364/200
4,251,861 2/1981 Mago ............................ 364/200

OTHER PUBLICATIONS

*Principles of Compiler Design*, Alfred V. Aho et al., Bell Laboratories, Murray Hill, New Jersey, 1977.

*Primary Examiner*—Raulfe B. Zache
*Attorney, Agent, or Firm*—Staas & Halsey

[57] ABSTRACT

The present invention discloses a data processing system having a program structure and execution mode where an actual argument is bound to a formal argument of a function to be called by storing a pair of a variable name as the formal argument and a variable as the actual argument into a First-In-Last-Out type stack memory which is an environment list, the function called executes processings using a latest bind value of said environment list when referring to variable values, when a value of such function is obtained, the function value is returned by deleting the formal argument variable of the function from the environment list. The system includes an associative buffer memory provided externally to the stack memory, where at least the variable name and location data of variable on the environment list are stored in the associative buffer memory, and thereby the access time for referring to variables stored in the stack memory can be curtailed.

7 Claims, 19 Drawing Figures

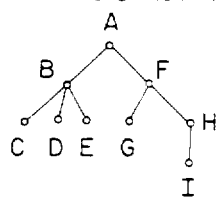
FIG. 1A.
TREE STRUCTURE
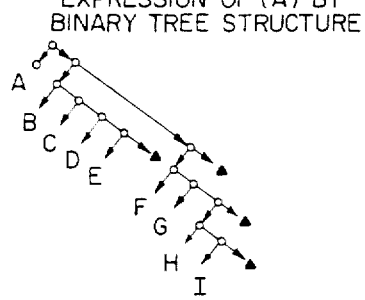
FIG. 1B.
EXPRESSION OF (A) BY BINARY TREE STRUCTURE
FIG. 1C.
CORRESPONDING TO THE BINARY TREE OF BINARY TREE LIST (B)
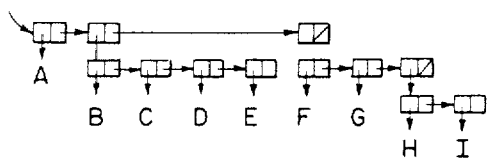
FIG. 2
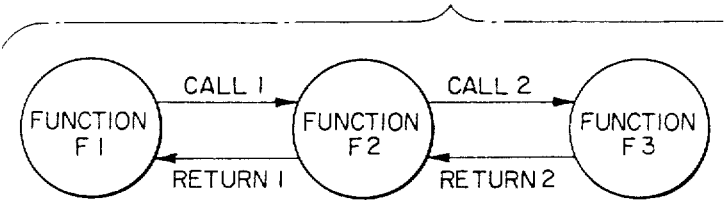 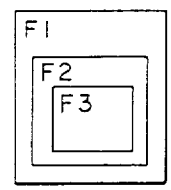
FIG. 3.
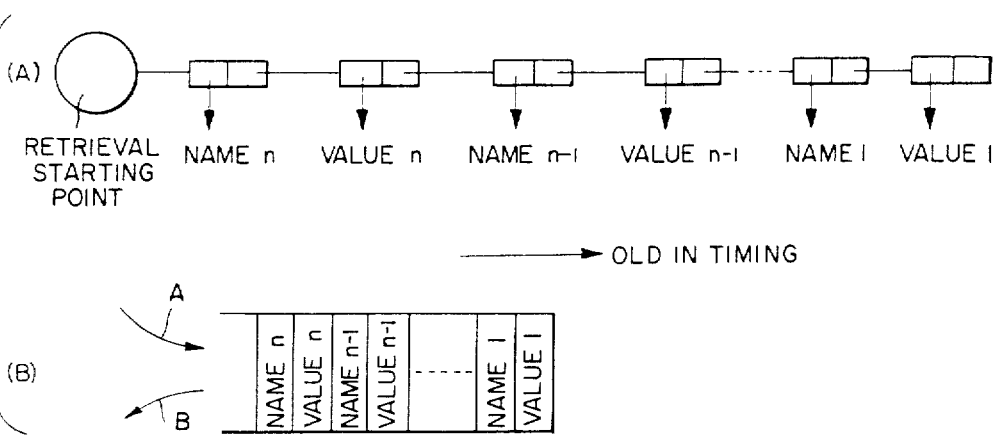

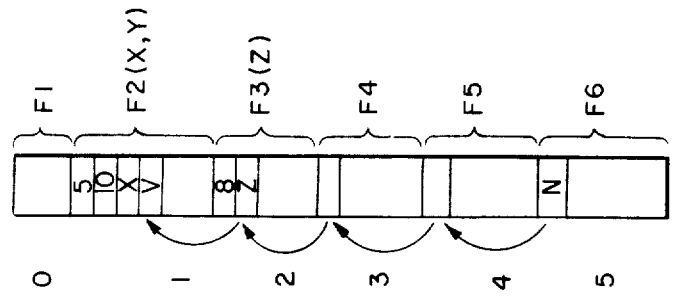
FIG. 5.
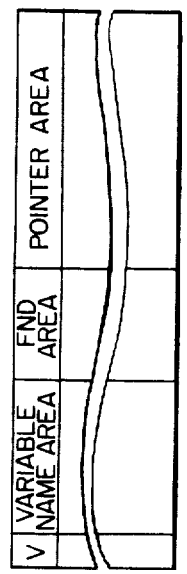
FIG. 6.
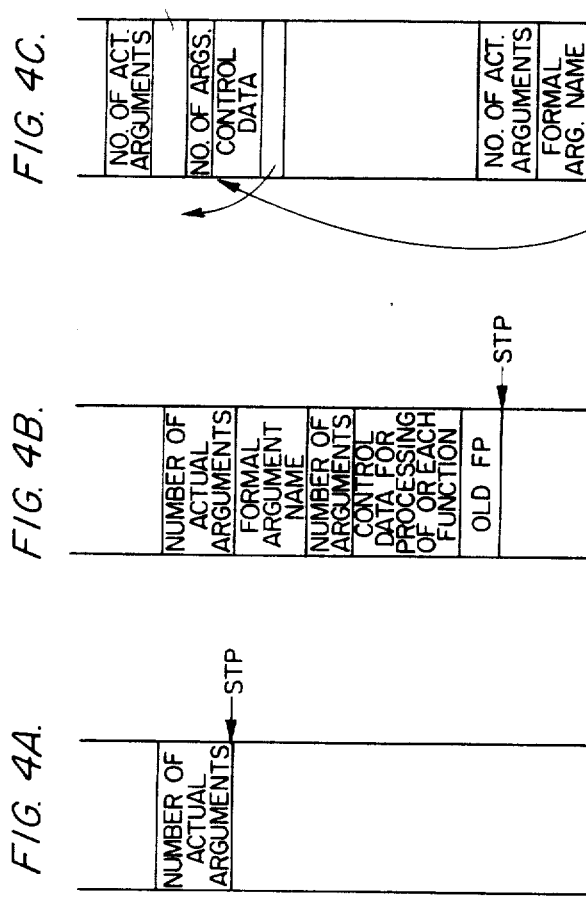
FIG. 4C.
FIG. 4B.
FIG. 4A.

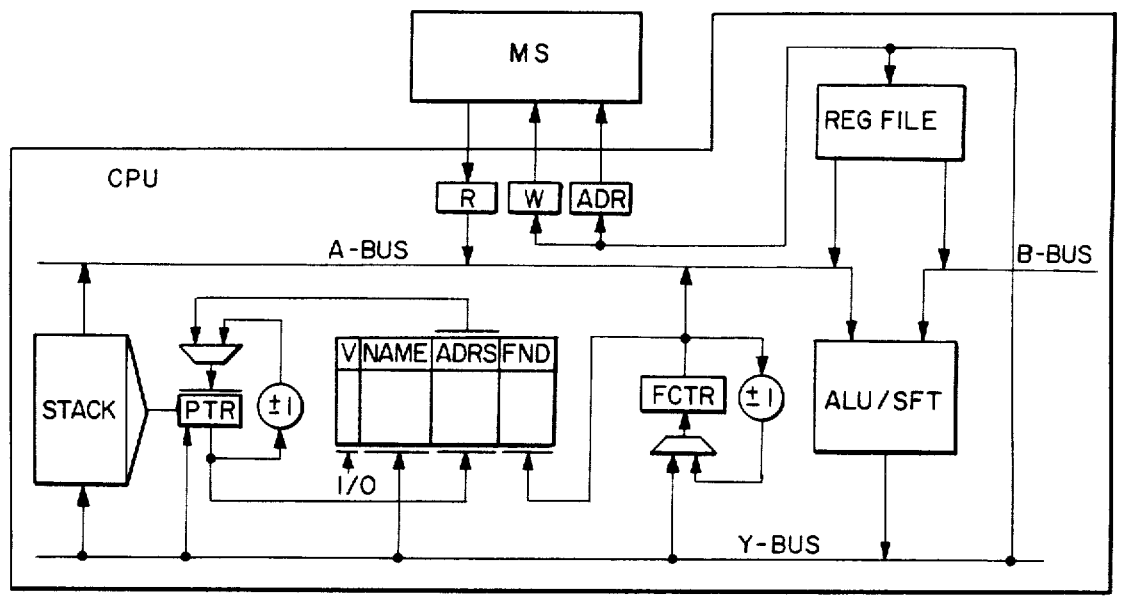

STACK MACHINE WITH IMPROVED CACHE MEMORY FOR VARIABLES

BACKGROUND OF THE INVENTION

1. Field of the Invention

The present invention relates to a functional language oriented processor like a lisp (namely a list Processor) which processes symbols or codes in place of numerals, particularly to a functional language oriented processor having such a structure that the environment in which functions are executed (what is used as a value of a variable) is stored as a stack structure in the memory within the computer system.

2. Description of the Prior Art

A Lisp deals, as shown in FIG. 1, with a binary tree list, namely a relationship of codes representing a tree structure (FIG. 1(A)) which is a gathering of nodes and branches and not including a closed loop or circular list. Namely, it stores the relationships of codes or symbols indicated by the tree structure as shown in FIG. 1(A) in the main memory in the form shown in FIG. 1(C) after such relationships are converted to the binary tree structure where each node has two branches. In other words, where each list cell or node is composed of one or two words of main memory and where each cell is composed of two (right and left) portions or fields. That is, the left portion of each cell usually stores the bit pattern of a code or symbol, for example, the code of letter A, while the right portion stores a pointer address or link to the next code or symbol connected to the code of the present node, thus indicating the connection of two cells. Therefore, the relationship of list cells in FIG. 1(C) realizes the binary tree list of FIG. 1(B) in the memory circuit. The Lisp is capable of obtaining the desired list structure by dynamically converting such list structure by executing a List language using the processor.

In the Lisp, programming means having a function which is formed by combining the following five basic functions which are necessary for converting the binary tree list is provided and a value for such function is obtained by executing the program.

The five basic functions are as follow:

(a) car [X]

Having a value of the binary tree list located at the end of the left branch of the binary tree list X;

(b) cdr [X]

Having a value of the binary tree list located at the end of the right branch of the binary tree list X;

(c) cons [X:Y]

Having a value of a new binary tree list formed by providing a new list cell where the left branch is considered the binary tree list X while the right branch the binary tree list Y;

(d) atom [X]

When X is an atom, it is considered as True (indicated by "T" or "*T*") and otherwise, it is considered as False (indicated by atom of "NIL"); and (e) eq [X:Y]

When X and Y are the same binary tree list, it is considered as true ("T" or "*T*") and otherwise it is considered as False (indicated by "NIL").

For example, when $f(x, y) = x^y + y^x$, a value of f(2, 3) becomes as follows, $\lambda[[X, Y]; X^Y + Y^X][2, 3] = 2^3 + 3^2$ by $f = \lambda[[X, Y]; X^Y + Y^X]$, and the corresponding relationship between variables can be defined clearly.

Here, (X, Y) is a variable called the formal argument and (2, 3) is a value of (X, Y) at this time called the actual argument. Substitution of the actual argument (2, 3) into the formal argument (X, Y) is called binding and obtaining the value of functions by binding the actual argement to the formal argument, in this case, formation of the wanted list of $2^3 + 3^2$ requires the execution of the Lisp. Therefore, there is a problem in the Lisp, namely in the functional language oriented processor concerning how to bind the formal argument to the actual argument.

In the processor which is an object of the present invention, a bind value of a variable is stored in a pair of comprising a variable name and a value for the linear list (environment list) on a FILO (First In Last Out or Push down Pop up) type stack. Here, the FILO type stack stores the data in a memory circuit in a binary tree list structure by using an indirect address system (namely, an address of a cell connected next to a certain cell is stored). The sequence where the pair of a variable name and a value is the same as that where the function using a variable of the argument is used. Such a method of forming this environment is generally called dynamic scoping. When searching for a value of a variable, the environment lists (or stacks) are sequentially retrieved, as a basic operation, from the heading of the list, namely from the newer list and the lists found are accessed sequentially beginning from the list found first. This method is called a Deep Bind type variable binding.

In general, the program structure and execution mode of the functional language are as follows and as shown in FIG. 2. For example, the actual argument (2, 3) is combined, that is, bound to the formal argument (X, Y) of the function to be called, namely the function, $f = \lambda[[X, Y]; X^Y + Y^X]$, the called (started) function executes the specified procedures by referencing the actual argument or a global variable transferred thereto, that is, substituted therefor and a value of such function $(2^3 + 3^2)$ is returned to the calling side. However, a side effect (that is, a changing of the environment) is not caused. Explanation of the side effect is omitted here because it is not directly related to the subject matter of the present invention.

When calling a function, methods of binding the actual argument to the formal argument are classified into the deep bind method and a shallow bind method.

As explained above, the deep bind method is a structure of an environment where a pair of the variable name (X, Y) and a value (2, 3) is stored in the form of a stack structure as the linear list, variables are sequentially referenced from a variable which has been previously bound and a value of a variable found first is used.

Namely, in the deep bind method, as shown in FIG. 3(A), a word, which is the storing unit of main memory, is divided into the right and left portions or fields forming a cell. The left portion stores variable names, while the right portion stores the address of the next cell to be connected and thereby indicates a variable of the next cell. In case there are many variables, these are connected as shown in FIG. 3(a) and the FILO type stack can be structured equivalently as shown in FIG. 3(B).

When binding a value to the formal argument while calling a function, a pair of the name and value is related from the direction from which the retrieval of the environment list (or environment stack) is started and the retrieval start point is updated as the header of newly added items. Namely, in the main memory of FIG. 3, the starting point corresponds to that the one cell n+1 provided in the heading area and the header cell is connected to the next cell n. In FIG. 3(B), the starting point corresponds to the push operation A for the stack and the cell having the variable name n+1 and a value (n+1) is entered in the latest stage of the stack by the push operation. At the time of returning a function, the retrieval start pointer is returned to the condition where the function was called. That is, in the main memory circuit of FIG. 3(A), it corresponds to where the cell n is placed in the heading area by extracting the heading cell n+1 and in FIG. 3(B) it means that n+1 and its value (n+1) are taken out of the stack by the pop operation B. The deep bind method has the following advantage in that the push-pop operation of a stack is simplified and overhead for bind processing for the argument of the variable at the time of calling a function or overhead for unbind processing for the argument of the variable at the time of returning from a function are comparatively little. Meanwhile it has a following disadvantage in that a longer time is required for referring to the variables not bound, namely the variables placed in the deep area of stack, like a global variables (also called free variable) must be found which requires considerable time.

In the case of the shallow bind method, a random access area (called the value cell) is provided for each variable in order to hold a value of the variable, the actual argument is stored into the value cell of argument of the variable at the time of calling the functions, values which are precedingly stored in the value cell are stored as a pair of a name and old value in the linear list (or stack), variables can be referred to only by reading the corresponding value cell, an an old value which has been stored in the linear list (or stack) is returned to the value cell of argument variable at the time of returning from the function call. The shallow bind method has an advantage in that variable (global) reference time is comparatively short, while it has a disadvantage in that overhead for bind processing for argument variable at the time of calling functions and overhead for the unbind processing at the time of returning the function are comparatively large.

As explained above, the deep bind method excels in a rate of bind/unbind processing of argument as compared with the shallow bind method but requires a longer time for refrence to an unbound variable particularly to a global variable. Namely, variables are referred to by the sequential method where the pointer is changed one by one, thus requiring a longer processing time.

SUMMARY OF THE INVENTION

It is an object of the present invention to curtail the access time for referring to variables being stored within the stack memory in accordance with a deep bind method in the above-mentioned functional language oriented processor.

In order to attain such an object, the present invention discloses a data processing system having such program structure and execution mode that the actual argument is bound to the formal argument of the function to be called by storing a pair of the variable name as the formal argument and the variable as the actual argument into a First-In-Last-Out type stack memory which is an environment list, the function called executes processing using the latest bind value of the environment list when referring to variable values, when a value of such function is obtained, the function value is returned by deleting the formal argument variable of the function from the environment list. An associative buffer memory is provided external to the stack memory, and at least variable names and location information for variables on the environment list are stored in this associative buffer memory.

BRIEF DESCRIPTION OF THE DRAWINGS

FIG. 1, including FIG. 1(A)-1(C), explains the binary tree list;

FIG. 2 shows a program structure and execution mode of a functional language;

FIG. 3 explains a deep bind method;

FIG. 4, including FIGS. 4(A)-4(C), explains the deep bind method on a stack;

FIG. 5 explains an environment list;

FIG. 6 shows the format of a virtual buffer in the first embodiment of the present invention;

FIG. 9 is a block diagram of a data processing system of the first embodiment;

FIG. 10 shows the format of a virtual buffer memory of the second embodiment;

FIG. 12 shows the format of a virtual buffer memory in the second embodiment.

DESCRIPTION OF THE PREFERRED EMBODIMENTS

Figure 7:
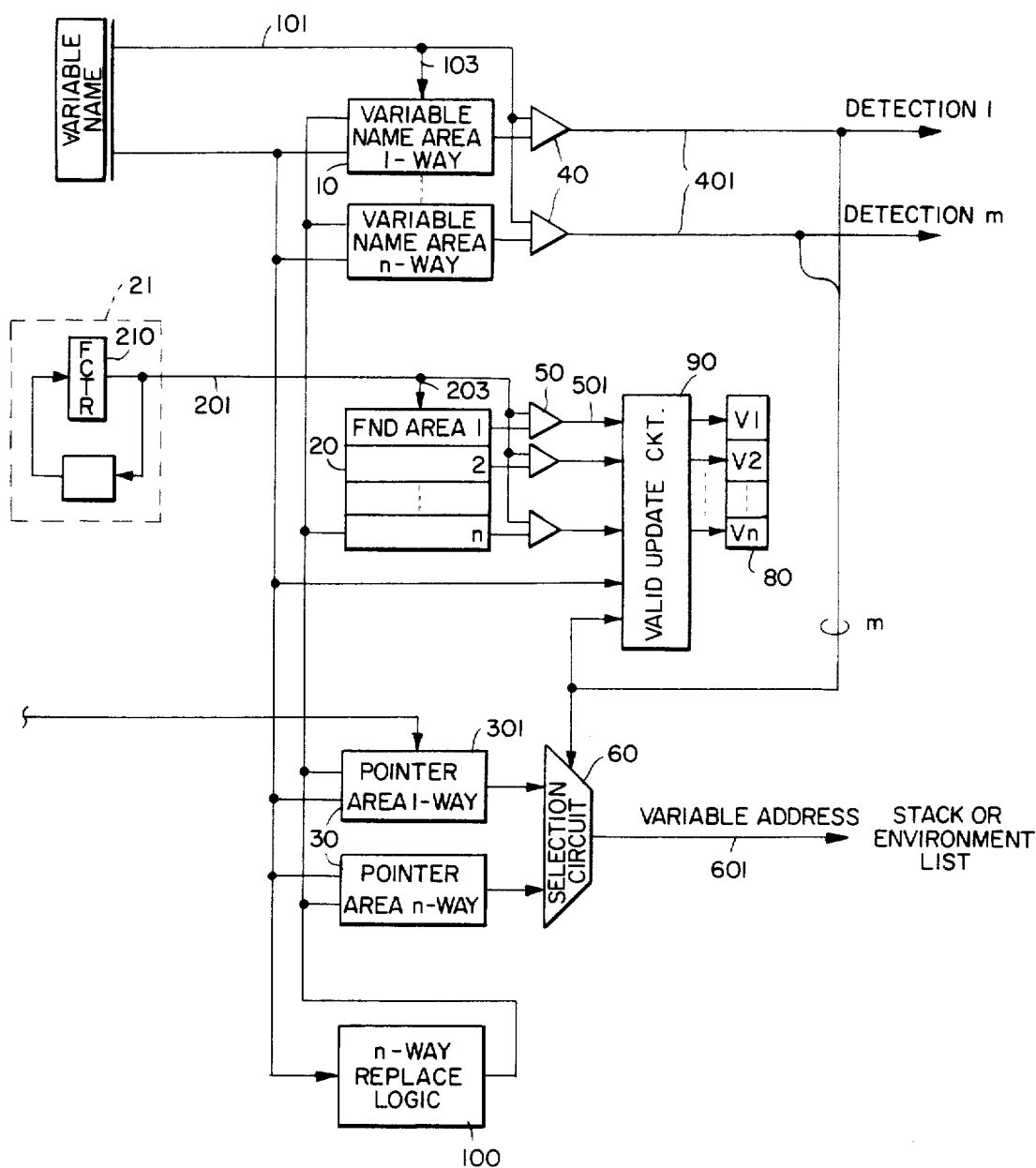
FIG. 7 is an associative buffer memory and counter in the first embodiment.

The preferred embodiment of the present invention is explained hereunder by referring to the attached drawings.

First, in a deep bind method on a stack, the following processings are carried out. When the real arguments are prepared before calling the functions, the stack becomes as shown in FIG. 4(A). Here, STP is the stack top pointer. When a function is called, the stack changes to that as shown in FIG. 4(B) on the side of called function.

Data for each function in the stack, as shown in FIG. 4(C) by above processing, are linked by the old FP. Here, FP indicates the frame pointer, namely a header pointer for control data of the function which is currently being executed. When variables are referred to by this link pointer, a value of the variable can be obtained by searching the variable names backward on the list.

For example, in the following three functions have the relationship that;

$$F_1(z) = z^2 + F_2(10)$$

$$F_2(x) = x^2 + x + F_3(7)$$

$$F_3(x) = x^5 + 1 + z$$

and a value of $F_1(3)$ is desired to be obtained. At the time of calling the function $F_1(z)$, the formal argument z is bound to 3 and the bind relation is stored on the environment list. However, since a value $F_2(10)$ of the function $F_2(x)$ is necessary for calculation of $F_1(z)$, the function $F_2(x)$ is called. At this time, the formal argument x is bound to 10 and its bind relation is stored on the environment list. However, since a value of $F_3(7)$ of the function $F_3(x)$ is necessary for calculation of $F_2(10)$, the function $F_3(x)$ is called. At this time, the formal argument x is bound to 7, and the bind relation is stored on the environment list. However, z of $F_3(x)=x^5+1+z$ is a global variable, namely a variable not bound at this time for obtaining a value $F_3(7)$ of $F_3(x)$, but since z is bound to 3 at the time of calling the function $F_1(z)$, it is determined that z is 3 by searching backward on the environment list. Then, a value of $F_3(7)=7^5+1+3$ is obtained, then a value of $F_2(10)=10^2+10+F_3(7)$ is obtained after returning, and finally a value of $F_1(3)=3^2+F_2(10)$ is obtained after returning to $F_1(z)$.

In the environment list of FIG. 5, it is estimated that the function $F_2$ is called by $F_1$, while $F_3$ by $F_2$, $F_4$ by $F_3$, $F_5$ by $F_4$ and $F_6$ by $F_5$.

At this time, the function $F_6$ is as follows.

$$F_6(N)=N^2+x+z+z^2$$

Namely, N is a local variable and x and z are global variables. A global variable x is bound to $x=5$ when the function $F_2(x, y)$ is called, while z is bound to $z=8$ when the function $F_3(z)$ is called. In order to make reference to each variable of N, x and z in view of calculating a value of $F_6(N)$, the environment list is first searched. As a result, a value for local variable N (for exammple, $N=10$) can be found immediately but the values of x and z can be found to be 5 and 8 after searching backwards on the environment list. However, if the data of $x=5$, $z=8$ which are found at the first time of storage on the environment list are stored in the associative buffer, the second reference to the same variable name is carried at first by making access to the associative buffer realizing speed-up of the bind operation for a global variable.

In general, the number of global variables are lesser in number than the number of local variables (or formal argument) in a functional language oriented processor but a small number of often accessed global variables are often necessary. Thereby, the associative buffer can be used effectively to increase efficiency.

This virtual buffer has the following functions. The practical structure of an associative buffer is explained later by making reference to an embodiment.

(A) When an access is made for the first time to the global variables, at least a variable name and location data for such variable on the environment list (or stack) are stored in the buffer in view of realizing a speed-up of the successive or later accesses.

(B) Hardware means detects whether the given variable name matches the internally stored variable name or not. When they match, an environment list address corresponding to such variable name must be read out. Namely, it is essential to provide the function of offering a value by associatively retrieving the buffer with the variable name used as the key. This function is necessary to make reference to the variables.

(C) A function for resetting a validity indication bit V of a variable having the same name as that of a variable on the buffer memory using the variable name as a key is also provided. This function is necessary for deleting global variables on the buffer when a function having the formal argument of the same name as the global variable existing on the buffer is called after the reference. If this processing is neglected, the rule of scoping which preferentially deals with the local variable rather than the global variables in the case of making reference to the variables of the same name is destroyed.

(D) Also provided is a function to reset the validity bit V of all items for which the location data match is made using such location data on the environment list as the key. This function is necessary, when the function returns to the calling side, for eliminating all argument variables of functions to be returned from the buffer. When this processing is neglected, if a variable of the same name as that of the formal argument of this function is bound before this function and such variables are referred to, a value which must have been eliminated from the environment may be used erroneously.

As explained above, if each variable is not stored in the buffer together with location data on the environment list, it is necessary to eliminate such an erroneous value by retrieving the buffer using each formal argument name of the function to be returned as the key or all buffers must be cleared. In case of the former, a longer time is required and in case of a the latter, the life of global variable in the buffer is limited to the period until the function referred to for the first time is returned, thus almost losing the beneficial effect of buffer.

The first embodiment of the present invention is explained below. FIG. 6 shows the format of an associative buffer of a first embodiment. In this figure, V is the validity display bit, a variable name area is used for storing a variable name, a FND area is used for storing data which indicates an argument of a certain function of a corresponding variable. The pointer area is used for address where the environment list storing a value of the variable is stored, namely an address on the stack. FIG. 7 shows the structure of the associative buffer memory of the first embodiment and the counter which adds or subtracts one at a time when calling or returning from the function, respectively.

In the first embodiment, the memories 10 and 30 are provided and each comprises the registers 1 to n. A memory 10 is a variable name area memory storing a variable name. The memory 20 is the FND area memory storing a value of the counter 21 which corresponds to the function having the variable as one of its arguments when the variable name is being stored into the memory 10. The memory 30 is the pointer area memory storing addresses within the stack. The ith memories $(i=1, 2, \ldots n)$ of the memories 10, 20 and 30 respectively correspond each other, forming one word. When a certain variable within the environment list of the functional language oriented processor is accessed for the first time, the name of such variable, the value of FCTR counter 210 at the time the variable is found and the address within the stack are respectively stored in the memories 10, 20 and 30 of the associative buffer to improve the rate of successive or later access. For the registration or storage into the associative buffer, a write pulse signal $WE_i$ (not illustrated) activates the cell of a variable name i via the input lines 101 and 103 for a variable name. Simultaneously, at this time, the content of FCTR counter 210 is also written into the ith cell in the FND area through the input lines 201 and 203 by activating the write signal $WE_i$. In the same way, an address in the stack is written into the ith cell in the pointer area from the input line 301 by activating the write signal $WE_i$. The associative buffer detects whether the given variable names match variable names previously stored within the internal memory 10 by using the matching circuit 40. When they match, one output line among n output lines 401 is activated, controlling the selection circuit 60. Thus, the associative buffer outputs the content of a corresponding cell 30, namely an address within the stack, onto the output line 601. Namely, an address within the stack can be read by associative retrieval using a variable name as the key.

The first embodiment includes the validity indication bit storing cell group 80 and valid update circuit 90 in order to realize the function for resetting the validity indication bit V in the FND area of the same pattern from the associative buffer using the content of counter FCTR 210 as the key. The $V_i$ cell among the cell group 80 storing the validity indication bit V is set by the write signal $WE_i$ (not illustrated) used for writing a variable name i, address i into the valid update circuit 90.

When an output 501 of the matching circuit 50 is selected and when the counter content output 201 of an input and the FND area pattern stored in the memory 20 match, the corresponding validity indication bit is reset and the buffer entry for which the FND area match occurs can be cleared at this time using the FCTR value as the key.

A variable name is also applied to the n-way replace logic 100 and its output is connected to the inputs of memories 10, 20 and 30.

Figure 8A:
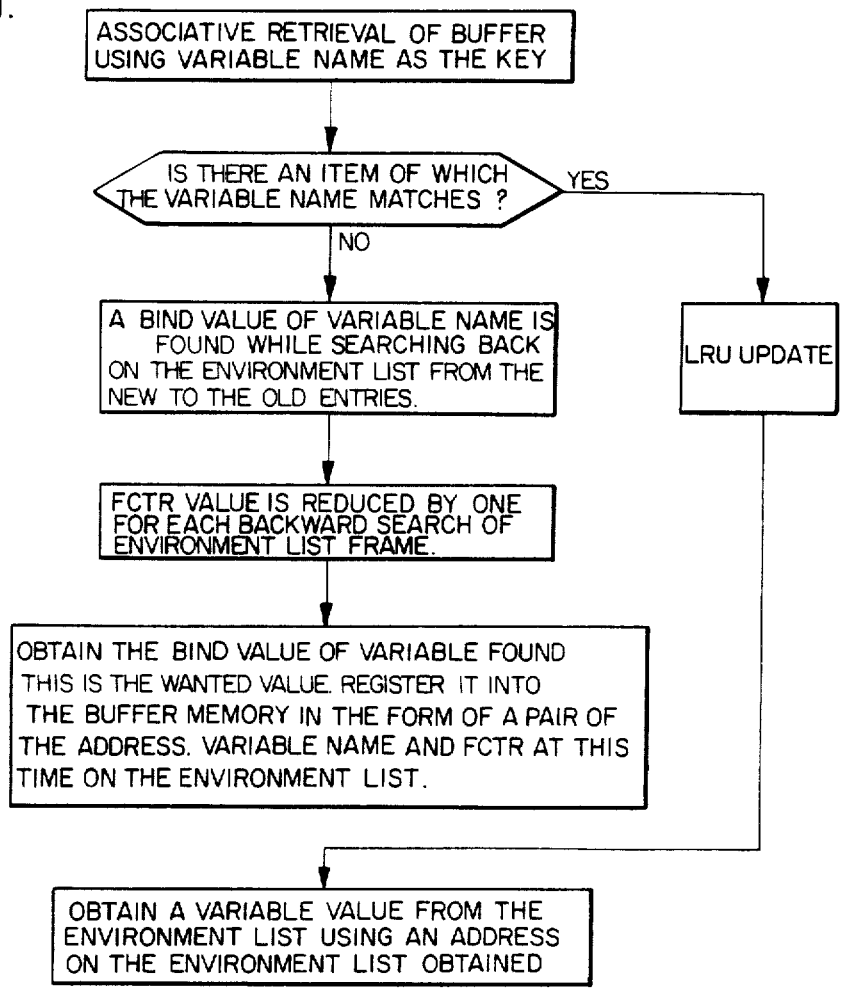
FIG. 8, including FIGS. 8(A)-8(C), indicates the processing flow in the first embodiment.
Figure 8B:
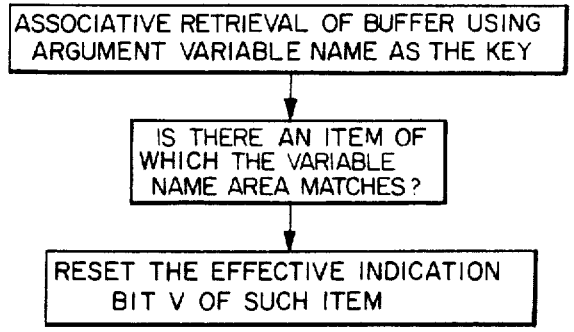
Figure 8C:
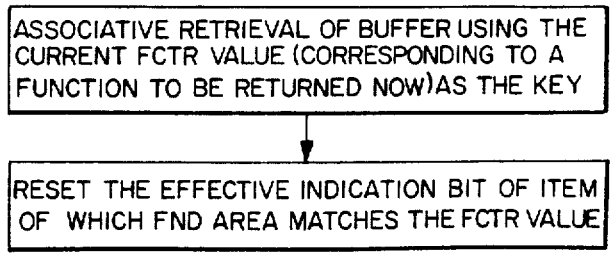

FIG. 8 is the processing flow in the first embodiment. FIG. 8(A) is the flow of reference to and registration or storage of variables. FIG. 8(B) is the flow of variable deletion at the time of calling a function. FIG. 8(C) is the flow of argument variable deletion associated with the function returning.

FIG. 9 is the block diagram of a data processing system in the first embodiment. Operation of the embodiment shown in FIG. 9 is as follows.

(1) Retrieving operation

1. Here, it is assumed that a variable name of which the value is to be obtained exists in the register file.

2. A variable name in the register file is read and is compared for retrieval with the NAME area of the associative buffer via the ALU/SFT, Y-BUS. If it exists, the ADRS (address of variable on the stack) area of the corresponding item is read, it is transferred to the PTR register (pointer register of STACK). Therefore, a wanted variable value can be obtained by reading the stack using PTR.

(2) Registration operation

3. If a wanted variable name does not exist in the associative buffer in item 2 above, the address information indicating the latest point on the environment list being stored in the register file is read and is transferred to the PTR via the ALU/SFT and Y-BUS. A value for a variable name in the register file is obtained by retrieving the environment list on the stack while updating the PTR and FCTR.

4. When a value of a variable is obtained on the environment list, the PTR at that time indicates a variable value address on the stack. The write operation V←1, NAME area←variable name in the register file, ADRS area←current PTR, FNO area←current FCTR is carried out at this time for the associative buffer. Thus, registration in the associative buffer is completed.

(3) Deleting operation incorporated with the function call

5. It is assumed that name of a formal argument of a function to be called exists in the register file.

6. A name of the formal argument is read from the register file and is compared for retrieval with the NAME area of the associative buffer via the ALU/SFT and Y-BUS. When a match of the item occurs, the validity indication bit V of such item is reset.

7. Naturally, FCTR shows an increment of +1 for the calling.

(4) Deleting operation incorporated with the function return

8. Here, it is assumed that a function is now just going to be returned. At this time, the FCTR holds the FNO value corresponding to a function to be returned.

9. Thus, the FCTR value is compared for retrieval with the FND area of the associative buffer and the validity indication bit V of all items matched using the FCTR value is reset.

Figure 11:
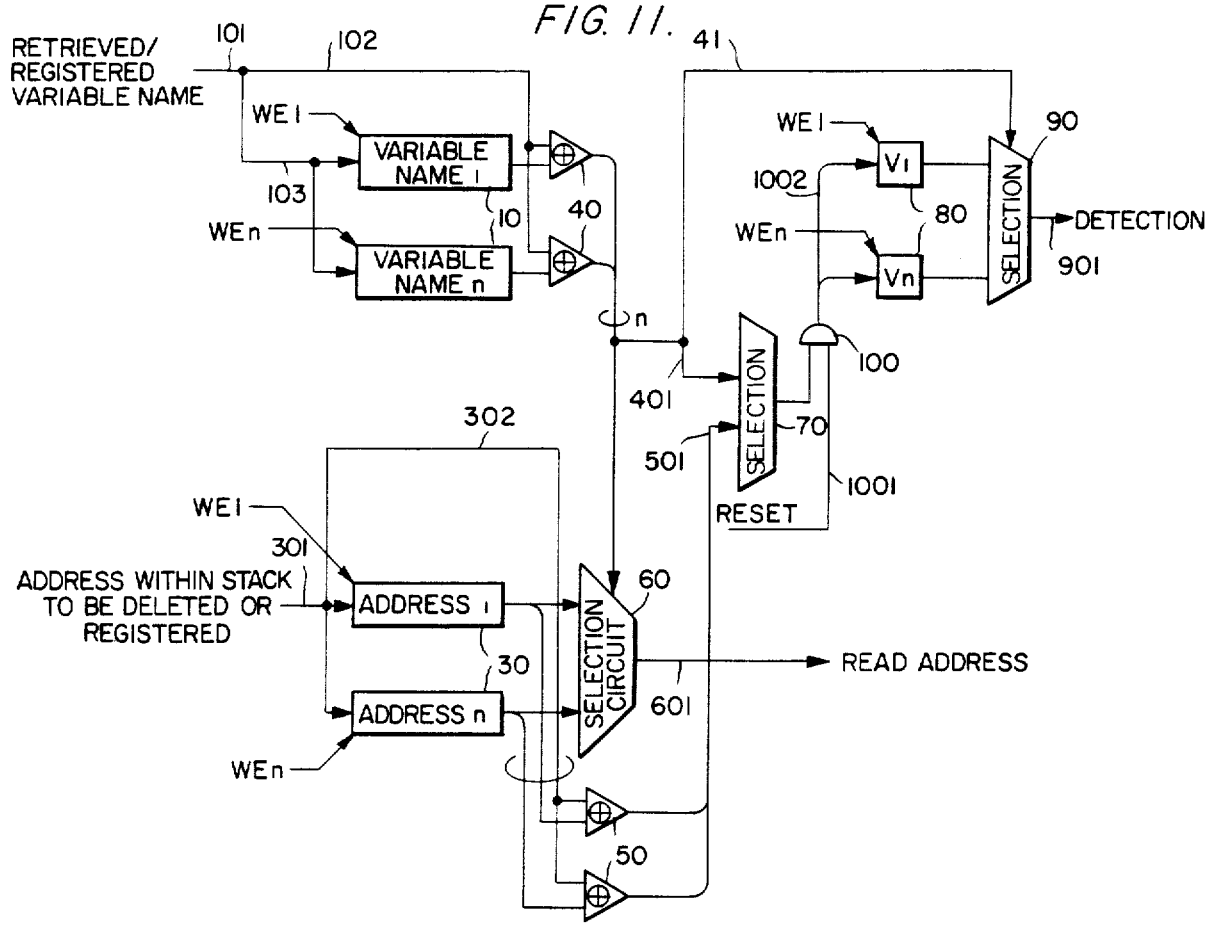
FIG. 11 is an associative buffer memory in the second embodiment.

Then, the second embodiment of the present invention is explained hereunder. FIG. 10 shows the format of the associative buffer memory in the second embodiment. FIG. 11 shows the practical structure of the associative buffer memory in the second embodiment.

In the second embodiment, the variable name memory 10 and address memory 30 are provided and each of them comprises registers 1 to n. The memory 10 stores the variable name and 30 stores addresses within the stack. The ith registers (i = 1, 2, ..., n) of the memories 10 and 30 correspond to each other, forming one word. When a global variable in the environment list of the functional language oriented processor is accessed for the first time, such global variable and address within the stack are respectively registered or stored in the memories 10 and 30 of the associative buffer in order to realize a speed-up of successive accesses. For the registration into the associative buffer, the write pulse signal $WE_i$ is activated and the name is written into the cell of variable name i via the input lines 101 and 103 for a variable name. Simultaneously, at this time, the address in the stack is written, by activating said write signal $WE_i$, into the ith cell of the buffer from the input line 301. The associative buffer detects by the matching circuit 40 whether the given variable name matches the variable name which has been stored previously in the internal memory 10. When they match, any one of n output lines 401 is activated controlling the selection circuit 60. Thus, the content of corresponding cell 30, namely an address within the corresponding stack is output onto the output line 601. That is, this associative buffer has a function of outputting addresses within the stack by associative retrieval using the variable names as the key.

In addition, in order to realize the function of resetting the validity indication bit V of the same item name from the variable names, this embodiment includes the validity indication bit storing cell group 80 and selection circuit 90.

The cell $V_i$ among the cell groups storing the validity indication bit V is set by the write signal $WE_i$ used for the variable name i and address i. When a variable name is used as the key, and when the reset signal 1001 is logic 1, the corresponding validity indication bit $V_i$ is reset, via the selection circuit 70 when the ith internal variable name and the ith variable name of input match in the matching circuit 40, from among the outputs 1002 by the AND circuit 100.

When an address is used as the key, and when the reset signal 1001 is logic 1, the corresponding validity indication bit $V_i$ is reset, via the selection circuit 70 when the ith internal address and the ith address input via the signal lines 301 and 302 match in the matching circuit 50, from among the outputs 1002 produced by the AND circuit 100. The addresses used for comparison in the matching circuit 50 are only a part of all address bits. Here, the selection circuit 70 is used for switching over the matching signal 401 based on the variable name key or the matching signal 501 based on the address key.

An output of the validity indication bit cell group is input into the selection circuit 90 and is selected through the control of an output 41 produced by the matching circuit 40. Therefore, the corresponding validity indication bit where a variable name and stored variable name match is output to the output 901 of the selection circuit 90.

Figure 13:
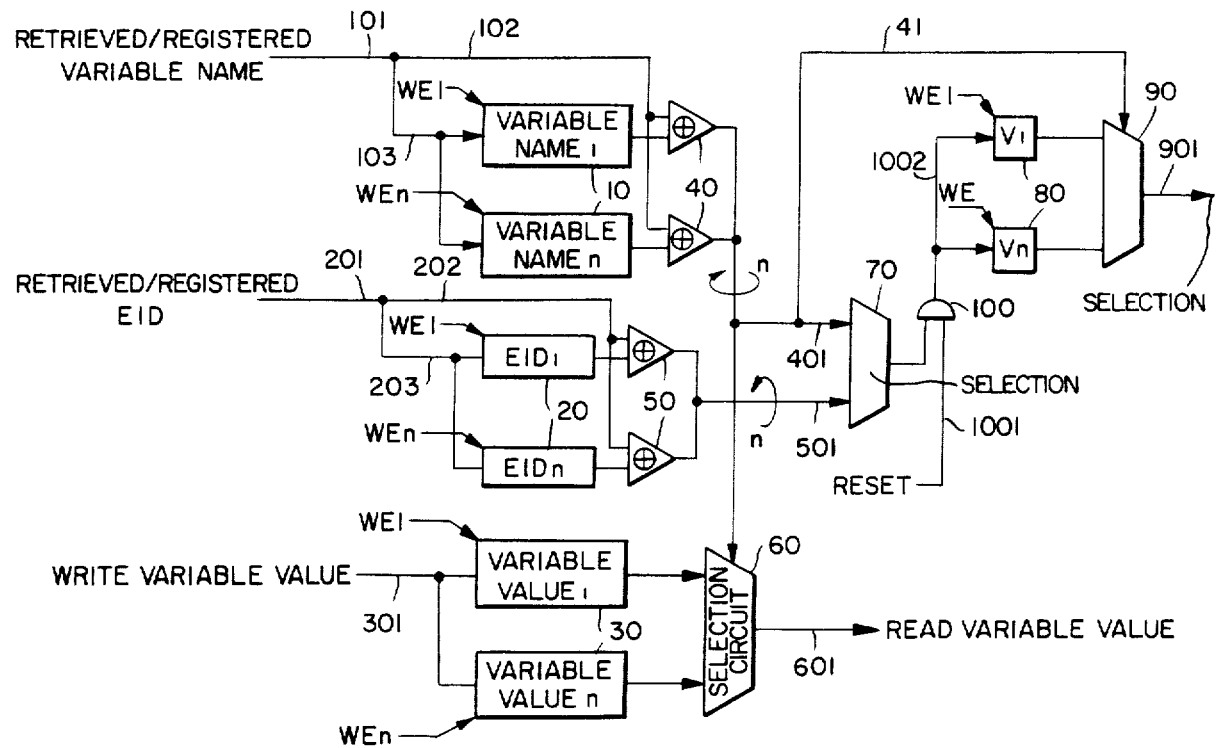
FIG. 13 is an associative buffer memory in the third embodiment.

Now the third embodiment of the present invention is explained. FIG. 12 shows the format of the associative buffer memory in the third embodiment. In FIG. 12, EID is the location data (Environment Identifier) on the stack. FIG. 13 shows a practical structure of the associative buffer memory in the third embodiment. In the third embodiment, the memories 10, 20 and 30 are provided and each comprises registers 1 to n. The memory 10 is used for storing variable names. 20 is used for storing the environment identifier. 30 stores variable values. The ith (i=1, 2, ... n) registers of said memories 10, 20 and 30 correspond to each other, forming one word. When a global variable in the environment list of the functional language oriented processor is accessed for the first time, the name of such global variable, EID and variable value are respectively registered in said memories 10, 20 and 30 of said associative buffer, thus realizing a speed-up successive accesses. For the registration into the associative buffer, the variable means is written after activation of the write pulse signal $WE_i$ into the cell of name i via the input lines 101 and 103 for inputting a variable name. Simultaneously, at this time, the environment identifier EID which is environment location data is written into the ith cell of EID, by activating the write signal $WE_i$, via the input lines 201 and 203. In the same way, a variable value is written into the ith cell, by activating the write signal $WE_i$, via the input line 301. The associative buffer detects whether the given variable name matches the variable name stored previously in the internal memory 10 by using the matching circuit 40. If they match, one of the n output lines 401 is activated, controlling the selection circuit 60. Thus, this associative buffer outputs the content of corresponding cell 30, namely the corresponding variable value onto the output line 601. That is, the associative buffer has a function of reading variable values by associative retrieval using the variable name as the key. Moreover, since the memory 30 for storing variable values is also capable of being written into by data, a value corresponding to the variable name can be read or written. This function is necessary for referring to and altering variable values.

In order to realize a function of resetting the validity indication bit V of the same item name from the associative memory buffer using the variable name or environment identifier as the key, this third embodiment includes the selection circuit 70 and the validity indication bit storing cell group 80 and the selection circuit 90.

The cell $V_i$, among the cell groups used for storing the validity indication bit V, is set by the write signal $WE_i$ for writing the variable name i, EIDi and variable value i.

When the variable name is used as the key, the selection circuit 70 selects an output line 401 of the matching circuit 40 and when the reset signal 1001 is logic 1, the corresponding validity indication bit $V_i$ is reset, at such a timing that the ith internal variable name and the ith variable name input match in the matching circuit 40, from among the outputs 1002 produced by the AND circuit 100.

An output of the validity indication bit cell group is input to the selection circuit 90 and is selected by the control of output line 401 of the matching circuit 40. Therefore, the selected validity bit is output to the output line 901 of the corresponding validity indication bit selection circuit 90 where the variable name and stored variable name match.

When an output 501 of the matching circuit 50 is selected by the selection circuit 70, the corresponding validity indication bit is reset when the EID input and EID being stored match.

As explained above the present invention realizes a speed-up of the access for retrieving the values of global variables by using the associative buffer in the functional language oriented processor which executes processing in accordance with the deep bind system.

While the present invention has been described with respect to a specific embodiment thereof, it is to be understood that the present invention is not limited thereto in any way but covers any and all changes and modifications which will become possible within the scope of the appended claims.

We claim:

1. A data processing system having a program structure and execution mode where an actual argument is bound to a formal argument of a function to be called by storing a pair of a variable name as the formal argument and a variable as the actual argument into a First-In-Last-Out stack memory as an environment list, the function called executes processings using a latest bind value from said environment list when referring to variable values, when a value of such function is obtained, said function value is returned by deleting the formal argument variable of the function from said environment list, said system comprising:

counter means for incrementing one and decrementing one for each call and return of the function, respectively;

associative buffer memory means, operatively connected to said counter means, for storing words where each word comprises the variable name, location data for the variable name, location data for the variable on the environment list of said stack memory and a count value of said counter means when variables are stored in said stack memory;

means for accessing said associative buffer memory means, responsive to a process reference to a variable for supplying the variable name as a key to said buffer memory means, for comparing said supplied variable name to the variable names stored in said buffer memory and for providing an indication of said comparison, responsive to an indication that said variable name is stored in said buffer memory means for obtaining a value for the variable name on the environment list using the location data corresponding to the variable name in the buffer memory means, responsive to an indication that said variable name is not stored in said buffer memory for obtaining a value for the variable name by searching variable names stored on said environment list and, responsive to a return from the function called for deleting the word of the buffer memory means which contains said counter value for said function.

2. A data processing system having a program structure and execution mode where an actual argument is bound to a formal argument of a function to be called by storing a pair of a variable name as the formal argument and a variable as the actual argument into a First-In-Last-Out stack memory as an environment list, the function called executes processings using a latest bind value from said environment list when referring to variable values, when a value of such a function is obtained, said function value is returned by deleting the formal argument variable of the function from said environment list, said system comprising:

an associative buffer memory having entries, where each entry is formed of a pair of the variable name and a bind location address data for such variable on the environment list; and control means, for searching said associative buffer memory when variables are referenced using the variable name as the key, when the name variable exists in said associative buffer memory, for obtaining the variable value by the random access of the environment list using said bind location address, but when no variable name exists in said associative buffer memory, for searching said environment list associatively using the variable name as the key and using the variable value found and for storing the variable name and the address on the environment list as a pair in said associative buffer memory, when binding such argument on the occasion of calling a function, for storing a pair of an argument name and a bind value in said environment list and simultaneously for deleting said associative buffer memory entry where the argument name and name match, when a function is returned from call, for deleting both a pair of the argument name and the bind value from said environment list and the entry within said associative buffer memory having the location address on the environment list.

3. A data processing system having a program structure and execution mode where an actual argument is bound to a formal argument of a function to be called by storing a pair of a variable name as the formal argument and a variable as the actual argument into a First-In-Last-Out stack memory which contains an environment list, the function called executes processings using a latest bind value from said environment list when reinforcing variable values, when a value of such function is obtained, said function value is returned by deleting the formal argument variable of the function from said environment list, said system comprising:

an associative buffer memory having words, where each word comprises a set of a variable name, a variable value and location data on said environment list to which the variable is bound; and control means, for searching the associative buffer memory when the variable is referenced using the variable name as the key, when the variable name matches the variable names being stored, for using the corresponding variable value by reading it, but if there is no match, for searching variable names on said environment list and for storing the variable name and the variable values along with the location data on said environment list into the associative buffer memory along with an operation identifier indicating where the latest variable value to be found is used, and when a function is called, for deleting the word which contains the name which matches the argument variable name, when a variable value is to be altered, for altering said latest bind value on the environment list and simultaneously if such variable exists therein, altering such variable value, and when a function returns from the call, for deleting a pair of the argument name and bind value from said environment list and simultaneously deleting the corresponding word from the associative buffer memory with the location data on the environment list used as the key.

4. A data processing system generating a variable name, comprising:

an associative buffer memory storing variable names and addresses of the variables corresponding to each of the variable names;

a pointer register operatively connected to said associative buffer memory;

a stack memory, operatively connected to said pointer register, for storing the variable names and variables; and control means for loading the address of the variable into said pointer register and reading the variable out of said stack memory in dependence upon the address loaded into said pointer register when the variable name is applied to said associative buffer memory and the variable name exists in said associative buffer memory, and when the variable name does not exist in said associative buffer memory for incrementing said pointer register until said pointer register contains the address of the variable name and reading out the variable from said stack memory in dependence upon the incremented address in said pointer register.

5. A data processing system as recited in claim 4, wherein said associative buffer memory comprises:

variable name registers operatively connected to receive and store the variable names;

first comparison circuits, operatively connected to said variable name registers, for comparing an input variable name with the variable names in said variable name registers and providing a first comparison indicator;

address registers for storing the variable addresses;

a first selection circuit, operatively connected to said first comparison circuits and said address registers, for selecting one of the variable addresses in dependence upon the comparison by said first comparison circuits;

second comparison circuits, operatively connected to said address registers, for comparing an input address with the variable addresses and providing a second comparison indicator;

a second selection circuit, operatively connected to said first and second comparison circuits, for selecting one of the first and second comparison indicators;

validity indication means, operatively connected to said second selection circuit, for indicating the validity of a selected variable address in dependence upon the one of the selected first and second comparison indicators; and a third selection circuit, operatively connected to said first comparision circuit and said validity indication means, for selecting and outputting the validity of the selected variable address in dependence upon the first comparison indicator.

6. A data processing system as recited in claim 4, further comprising a function counter operatively connected to said associative buffer memory;
wherein said associative buffer memory stores a function indicator; and
wherein said associative buffer memory comprises:
   variable name registers operatively connected to receive and store the variable names;
   first comparison circuits, operatively connected to said variable name registers, for comparing an input variable name with the variable names stored in said variable name registers and producing a first comparison indicator;
   function indication storage registers operatively connected to said function counter;
   second comparison circuits, operatively connected to said function indication storage registers and said function counter, for comparing the contents of said function counter and said function indication storage registers and producing a second comparison indicator;
   validity indication means, operatively connected to said first and second comparison circuits, for indicating the validity of a selected variable address in dependence upon the first and second comparison indicators;
   address registers, operatively connected to receive the variable name, for storing the addresses of the variables; and
   a selection circuit, operatively connected to said first comparison circuits and said address registers, for selecting one of the addresses of one of the variables in dependence upon the first comparison indicator.

7. A data processing system as recited in claim 4, wherein said associative buffer memory stores a variable value and environment identifier data including the address of the variable in said stack memory,
wherein said associative buffer memory comprises:
   variable name registers operatively connected to recieve the variable names;
   first comparison circuits, operatively connected to said variable name registers and to receive an input variable name, for comparing the input variable name with the variable names stored in said variable name registers;
   environmental identification registers for storing environmental identifiers;
   second comparison circuits, operatively connected to said environmental identification registers and to recieve an input environmental identifier, for comparing the input environmental identifiers stored in said environmental identification registers and producing a second comparison indicator;
   variable value registers for storing the variable values;
   a first selection circuit, operatively connected to said first comparison circuits and said variable value register, for selecting the variable values in dependence upon the first comparison indicator;
   a second selection circuit, operatively connected to said first and second comparison circuits for selecting one of the first and second comparison indicators; and
   validity indication means, operatively connected to said second selection circuit, for indicating the validity of the variable value selected in dependence upon the one of the first and second comparison indicators selected.

* * * * *

UNITED STATES PATENT AND TRADEMARK OFFICE
CERTIFICATE OF CORRECTION

PATENT NO. : 4,517,640
DATED : May 14, 1985
INVENTOR(S) : AKIRA HATTORI ET AL.

It is certified that error appears in the above-identified patent and that said Letters Patent is hereby corrected as shown below:

Col. 1, line 45, "follow" should be --follows--.

Col. 2, line 6, "argement" should be --argument--;

line 13, delete "of";

line 60, "(a)" should be --(A)--.

Col. 3, line 33, "an" (first occurrence) should be --and--.

Col. 4, line 9, "the" should be --a--;

line 54, delete "in".

Col. 5, line 36, after "realizing" insert --a--.

UNITED STATES PATENT AND TRADEMARK OFFICE
CERTIFICATE OF CORRECTION

PATENT NO. :     4,517,640
DATED      :     May 14, 1984
INVENTOR(S) :    AKIRA HATTORI ET AL.

Page 2 of 3

It is certified that error appears in the above-identified patent and that said Letters Patent is hereby corrected as shown below:

Col. 6, line 20, delete "a";

line 21, after "of" insert --a--;

line 23, after "of" insert --the--;

line 31, "address where" should be --storing--;

"storing" should be --address where--;

line 46, after "..." insert --,--;

line 47, after "correspond" insert --to--.

Col. 9, line 23, after "..." insert --,--;

line 31, "means" should be --name--.

Col. 11, line 49, "rein-" should be --ref---;

line 50, "forcing" should be --erencing--.

Col. 14, line 6, "recieve" should be --receive--;

UNITED STATES PATENT AND TRADEMARK OFFICE
CERTIFICATE OF CORRECTION

PATENT NO. : 4,517,640

DATED : May 14, 1984

INVENTOR(S) : AKIRA HATTORI ET AL.

It is certified that error appears in the above-identified patent and that said Letters Patent is hereby corrected as shown below:

Column 14, line 16, "recieve" should be -- receive --.

Signed and Sealed this

Fifteenth Day of October 1985

[SEAL]

Attest:

Attesting Officer

DONALD J. QUIGG

Commissioner of Patents and Trademarks—Designate